United States Patent [19]
McCoy et al.

[11] Patent Number: 4,457,371
[45] Date of Patent: Jul. 3, 1984

[54] METHOD FOR DEMULSIFICATION OF BITUMEN EMULSIONS

[75] Inventors: David R. McCoy; Edward E. Entire; Robert M. Gipson, all of Austin, Tex.

[73] Assignee: Texaco Inc., White Plains, N.Y.

[21] Appl. No.: 326,455

[22] Filed: Dec. 2, 1981

[51] Int. Cl.$^3$ .................. E21B 43/24; E21B 43/40
[52] U.S. Cl. .................. 166/267; 166/303; 208/188; 210/708; 252/344
[58] Field of Search .......... 252/331, 341, 344, 358; 208/188, 11 LE, 11 R; 210/708; 166/266, 267, 272, 303

[56] References Cited

U.S. PATENT DOCUMENTS

| 2,915,476 | 12/1959 | Shen | 252/341 |
| 2,995,512 | 8/1961 | Weidner et al. | 252/344 X |
| 3,691,086 | 9/1972 | Lees et al. | 252/344 X |
| 4,127,170 | 11/1978 | Redford | 166/271 X |
| 4,154,698 | 5/1979 | Doft | 252/344 X |
| 4,160,742 | 7/1979 | Raman | 252/344 |

Primary Examiner—George A. Suchfield
Attorney, Agent, or Firm—Jack H. Park; Kenneth R. Priem; David L. Mossman

[57] ABSTRACT

A process for recovering bitumen from oil-in-water (O/W) emulsions is disclosed wherein water soluble demulsifiers are used. These demulsifiers are polymers of specific quaternary ammonium monomers or co-polymers of these quaternary ammonium monomers wth other types of monomers wherein the greater portion of the co-polymer is comprised of the quaternary ammonium monomers. To resolve the bituminous petroleum emulsions, the process is carried out between 25° and 160° C. wherein the demulsifier of the invention is contacted with the bituminous emulsion.

2 Claims, No Drawings

METHOD FOR DEMULSIFICATION OF BITUMEN EMULSIONS

BACKGROUND OF THE INVENTION

1. Field of the Invention

This invention is concerned with the breaking or resolution of oil-in-water (O/W) bituminous emulsions by treatment with polymers of quaternary ammonium monomers.

2. Description of the Related Art

A great volume of hydrocarbons exist in known deposits of tar sands. These deposits occur at various places, the Athabasca tar sands in Canada being an example. The petroleum in a tar sand deposit is an asphaltic bitumen of a highly viscous nature ranging from a liquid to a semisolid. These bituminous hydrocarbons are usually characterized in being very viscous or even non-flowable under reservoir conditions by the application of driving fluid pressure.

Where surface mining is not feasible, the bitumen must be recovered by rendering the tar material mobile in-situ and producing it through a well penetrating the tar sand deposit. These in-situ methods of recovery include thermal, both steam and in-situ combustion and solvent techniques. Where steam or hot water methods are used, a problem results which aggravates the recovery of the bitumen. The difficulty encountered is emulsions produced by the in-situ operations. These emulsions are highly stable O/W emulsions which are made even more stable by the usual presence of clays. Most liquid petroleum emulsions are water-in-oil (W/O) types. These normal W/O emulsions are broken by methods known in the art. However, the bitumen emulsions which are O/W types present a much different problem, and the same demulsifiers used in W/O emulsions will not resolve the O/W bitumen emulsions. The uniqueness of these O/W bitumen emulsions is described in C. W. W. Gewers, *J. Canad. Petrol. Tech.*, 7(2), 85–90 (1968). (Prior art Reference A.) There is much prior art concerning the resolution of normal W/O emulsions. Some of the art even mistakenly equates bitumen W/O emulsions with these W/O emulsions. The following is a list of several art references.

B. Texaco Canada was granted a recent patent, U.S. Pat. No. 4,058,453, for breaking bitumen emulsions using high molecular weight poly(ethylene oxides) of >1,000,000 molecular weight with optional addition of alkaline earth metal halide.

C. U.S. Pat. No. 4,141,854 claims the use of quaternary ammonium salts of co-polymers of acrylamide and dialkylaminoethylmethacrylate compounds (5–50 wt.% amino monomer units present) for breaking W/O emulsions encountered in uranium ore solvent extraction. To break O/W emulsions, it was necessary to first adjust the pH to 9 with NH₃ and invert the emulsions with a surfactant (U.S. Pat. No. 4,154,698).

D. In U.S. Pat. No. 4,120,815 a 50:50 wt.% copolymer of acrylamide (or acrylic acid) with diallyl dialkylammonium chloride was used to brek O/W emulsions encountered in refineries or waste treatment streams.

E. In U.S. Pat. No. 4,160,742 co-polymers of acrylamide and methacrylamidopropyltrimethylammonium chloride (MAPTAC) (at least 50 wt.% acrylamide present) were used to break O/W oil refinery waste stream emulsions.

F. U.S. Pat. No. 3,585,148 claims the use of acrylamide co-polymers with diallyl (or dimethallyl) dialkylammonium salts (containing no more than 25 wt.% quaternary salt) to break O/W emulsions.

G. U.S. Pat. No. 4,224,150 describes a process for clarifying water containing oil or suspended solids by treatment with polymers of a quaternary ammonium monomer which has a structure different from that claimed by our invention. Further, the breaking of bitumen emulsions with the use of these polymers is not mentioned. The structure for the monomer in U.S. Pat. No. 4,224,150 is as follows:

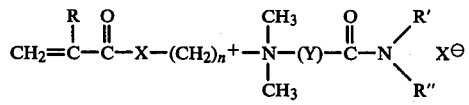

SUMMARY OF THE INVENTION

The invention is a method for recovering petroleum from O/W bitumen emulsions by resolving or breaking these emulsions by contacting the emulsions at a temperature of between 25° and 160° C. with polymers greater than about 50,000 molecular weight of compounds having the general structure

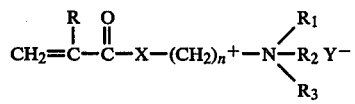

where R=H or lower alkyl, X=NH or O, n=>1, R₁ and R₂=alkyl, R₃=alkyl, alkenyl, alkylaryl, or hydroxyalkyl, and Y=an anion such as chloride, acetate, bromide, sulfate, etc. Also included in this invention are co-polymers of these monomers with other monomers such as acrylamide wherein the weight percent of the monomers of the above structure is present in amounts equal to or greater than about 60% of the total co-polymer composition.

Also included in our invention is a method for recovering oil or bitumen from subterranean formations by use of reclaimed water from broken bitumen emulsions obtained in the method described above. This method comprises adding to the water separated from bitumen emulsions using the above mentioned technique enough anionic compound to remove the demulsifying chemical from the solution. The reclaimed waters are then recycled to subsequent steam or hot water floods of tar sands deposits without hindering the desirable in situ emulsification processes from taking place.

DESCRIPTION OF THE PREFERRED EMBODIMENTS

Especially useful and preferred in the process of this invention are polymers of the quaternary ammonium monomer whose structure is found in the Summary of the Invention wherein R is CH₃, n has a value of from 2 to 3, and R₁ and R₂ are CH₃. The other substituents and ranges are as they appear in the description in the Summary of the Invention.

Also, where co-polymers of these quaternary ammonium monomers are used, it is preferable that the co-polymer contain greater than 80 wt.% of the quaternary ammonium monomer described in the Summary of the Invention.

The produced bitumen emulsions may be treated by the process of our invention in a conventional manner, for example, in a conventional horizontal treater operated, for example, from about 25° to 160° C. and, preferably, above 60° C. at atmospheric or slightly higher pressures. The concentration of the chemical demulsifier described above used in treating the bitumen in water emulsions may range from about 1 to 200 parts per million and, preferably, from about 30 to 100 parts per million with the optional addition of an organic diluent and/or inorganic salt as well as standard flocculants and mechanical or electrical means of demulsification.

After the bitumen emulsion is broken there is a water phase which must be disposed of. The most efficient way to dispose of this water phase is to use it to recover more bitumen or other hydrocarbons by reinjecting it into a suitable formation. However, since the water phase contains the demulsifying chemicals used to break the emulsion, it will have a deleterious effect on the recovery of additional bitumen if injected into the formation. In the recovery of bitumen and heavy oils, it is generally the object of injecting an aqueous fluid to emulsify the bitumen and, therefore, make it more mobile so that it may be recovered. Therefore, the demulsifying chemicals contained in the aqueous phase must be removed prior to reinjection into the bitumen containing formation.

Therefore, another embodiment of this invention is a process for recovering bitumen from a tar sand formation comprising injecting into the tar sand a fluid containing hot water and/or steam in order to emulsify the bitumen in the tar sand and recovering the emulsified bitumen, demulsifying the emulsion by adding thereto at a temperature of between 25° and 160° C. polymers greater than about 50,000 molecular weight of compounds having the general structure

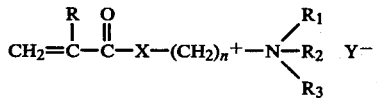

where $R=H$ or lower alkyl, $X=NH$ or $O$, $n=>1$, $R_1$ and $R_2=$alkyl, $R_3=$alkyl, alkenyl, alkyl aryl, or hydroxy alkyl, and $Y=$an anion such as chloride, acetate, bromide and sulfate. Thereafter, the demulsifying chemicals are removed by precipitation from solution by addition of enough anionic chemicals such as surfactants or anionic polymers to precipitate the demulsifying chemicals from solution. Then the aqueous phase is reinjected into a bitumen containing formation to recover additional bitumen.

The following examples describe more fully the present process. However, these examples are given for illustration and are not intended to limit the scope of the invention.

EXAMPLE 1

A methacrylamidopropyltrimethylammonium chloride (MAPTAC)* polymer was prepared as follows: To a one-liter glass reactor were charged 200 g MAPTAC (50% solids, 50% water); 134 g deionized water; 0.1 g sodium salicylate; and 0.5 g 2,2'-azobis(2-amidinopropane)hydrochloride. The reactor contents were deoxygenated by passing a stream of nitrogen through for one hour at the rate of 14 liters/hour. The nitrogen padded reactor was then heated for 5.7 hours at 50° C. The viscosity of the resulting polymer solution was ca. 1300 cp. The viscosity of a 0.5% solution of the polymer in water was 10 cp. Monomer conversion was 98% (viscosities were measured with the Nameter Vibrating Sphere Viscometer at 25° C.).

*MAPTAC=methacrylamidopropyltrimethylammonium chloride, $CH_2=C(CH_3)CONH(CH_2)_3N^{\oplus}(CH_3)_3Cl^{\ominus}$.

EXAMPLE 2

An example similar to that above was carried out, but the sodium salicylate was omitted. The viscosity of a 0.5% solution in water was 10.3 cp. The monomer conversion was 99+%.

EXAMPLE 3

An experiment similar to Example 1 was performed but only 100 g deionized water was added and 100 g of isopropanol was added. The sodium salicylate was omitted. The conversion of monomer was 92% and a 0.5% solution of the polymer had a viscosity of 5.6 cp.

EXAMPLE 4

To a glass kettle were charged 100 g of a 61.3% solution of methacrylamidopropylhydroxyethyldimethyl ammonium acetate (MAPHDA)*; 400 g deionized water, and 0.5 g 2,2'-azobis(2-amidinopropane)-hydrochloride. Following one hour deaeration with nitrogen, the solution was heated to 50° C. for five hours, then at 60° C. for 1.5 hours. Conversion of the monomer was 99%. The viscosity of a 0.5% polymer solution was 8.45 cp.

MAPHDA=methacrylamidopropylhydroxyethyldimethyl ammonium acetate

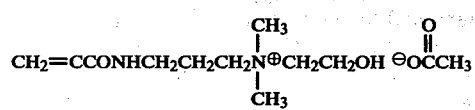

EXAMPLE 5

A co-polymer of MAPTAC and acrylamide was prepared as follows: to a glass reactor were charged 160 g MAPTAC (50% aqueous solution); 80 g acrylamide (50% aqueous solution); 340 g deionized water; 20 g isopropanol; 0.5 g 2,2'-azobis(2-amidinopropane)hydrochloride; and 0.2 g ethylenediamine tetraacetic acid, disodium salt. After nitrogen purging, the reactor was immersed in a 50° water bath for four hours to provide the polymer product. The viscosity of a 0.5% solution of the polymer at 25° was 11.8 cp.

EXAMPLE 6

An experiment identical to Example 5 was performed, except the isopropanol was replaced with deionized water. The viscosity of a 0.5% solution of the polymer was 14.2 cp at 25° C.

Relative molecular weights were obtained on the polymers prepared in Examples 1-6 by size exclusion liquid chromatography. The column material was silica with an average pore size of 1,000 angstroms. The silica was treated with an amino-organosilane. Elution solvent was 0.1 N nitric acid. Polyacrylamide standards were used. The approximate molecular weights are shown below for the instant polymers.

| Polymer of Example | Molecular Weight |
|---|---|
| 1 | 1 million |
| 2 | — |
| 3 | 0.5 million |
| 4 | 1.7 million |
| 5 | 1.3 million |
| 6 | 1.7 million |

EXAMPLE 7

Acrylamide-MAPTAC Co-polymer

Using standard emulsion polymerization techniques, such as those found in U.S. Pat. No. 4,152,200, comparative example A, a>1,000,000 molecular weight co-polymer was prepared from a mixture of 74 wt.% acrylamide and 26 wt.% MAPTAC. The product emulsion contained 27.6 wt.% polymer.

To a solution of 0.25 g TWEEN®80 in 96 g H$_2$O was added 3.62 g of the above emulsion with stirring to invert the emulsion and prepare a 1 percent aqueous polymer solution (product a).
TWEEN®80=20 molar ethoxylate of sorbitan monooleate The procedure above was repeated in the absence of TWEEN 80 to prepare solution b.

EXAMPLE 8

Demulsifier Testing

The following basic testing procedure was employed:
a. A 1 weight percent solution (on an amines charged basis where aminopolymers were used, rather than on an amines salts basis) of each chemical was prepared in water.
b. A 30 ml PYREX® test tube equipped with screw top was charged with 23 ml emulsion of 11.5 weight percent bitumen content obtained by in-situ steam flooding in tar sand pattern located at Ft. McMurray, Alberta, Canada.
c. 2 ml Wizard Lake crude oil was added as diluent and the contents of the test tube were mixed.
d. The contents of the test tube were equilibrated in a 80° C. oven for 1-2 hours and mixed again.
e. Chemical was added to the hot, dilute emulsion at the following concentrations: 30, 60, 120 ppm.
f. Contents of the test tubes were mixed, re-equilibrated in an oven at 80° C. for 1 hour and mixed again.
g. After 20 hours of standing at 80° C., measurements were made on the volume of top and middle layers, and the appearance of the aqueous phase was noted. Samples of some top layers were carefully removed by pipetting and subjected to Karl-Fischer analysis for determination of the water content.

Comparative examples 8d, 8h and 8i are given to show the relative ineffectiveness of compounds cited in Prior Art reference B.

Comparative examples 8b and 8c are given to show the relative ineffectiveness of co-polymers containing less than 50 wt.% cationic character. Better results are seen for co-polymers with 66 wt.% cationic present (Example 8p-8u). And even better results are seen for cationic homopolymers.

In most of the examples given, the required demulsifier dosage for best results is seen to be >60 ppm.

Some effect of molecular weight can be seen in these examples, with >1,000,000 molecular weight polymers giving better results than a 500,000 molecular weight polymer (compare 8a, e, f and g with 8m, n and o).

Successful examples are given for claimed chemicals having Y=Cl and R$_3$=CH$_3$ and having Y=CH$_3$CO$_2$ and R$_3$=CH$_2$CH$_2$OH.

Example 8a represents the first successful reduction to practice of this invention.

Specific test results are summarized in Table I on the following pages.

TABLE I

Demulsifier Testing

| Example 8 | Candidate Demulsifier | Concentration, (ppm) | Oil Phase Volume in ml (% H$_2$O) | Emulsion Phase Volume in ml (% H$_2$O) | Aqueous Phase Appearance |
|---|---|---|---|---|---|
| a | Product of Example 1 | 60 | 8 (15.2) | 0 | Dark, translucent |
| b | Product a of Example 7 | 60 | 2 | 5 | Muddy |
| c | Product b of Example 7 | 60 | 1.5 | 3 | Muddy |
| d | POLYOX® WSR-301** | 60 | 9 (53.2) | 0 | Light translucent |
| e | Product of Example 2 | 30 | ~6 | 0 | Muddy |
| f* | Product of Example 2 | 60 | 8 (21.9) | 0 | Clear, colorless |
| g* | Product of Example 2 | 120 | 10 (1.43) | 0 | Clear, colorless |
| h | POLYOX WSR-301** | 60 | 6 (49.1) | 0.5 | Brown, translucent |
| i | POLYOX WSR-301** | 120 | 7 (34.3) | 2 | Brown, translucent |
| j | Product of Example 4 | 30 | 8.5 | 0 | Muddy |
| k | Product of Example 4 | 60 | 4 (6.34) | 3.5 | Dark, translucent |
| l* | Product of Example 4 | 120 | 4 (1.74) | 3 | Yellow, transparent |
| m | Product of Example 3 | 30 | 5 | 2.5 | Muddy |
| n | Product of Example 3 | 60 | 5.5 (17.9) | 1.5 | Dark, translucent |
| o* | Product of Example 3 | 120 | 4 (2.64) | 6(72.3) | Yellow, transparent |
| p | Product of Example 5 | 30 | 9 (86.9) | 0 | Muddy |
| q | Product of Example 5 | 60 | 4.5 (98.6) | 4 | Brown, transparent |
| r* | Product of Example 5 | 120 | 4 (2.16) | 11 | Yellow, transparent |
| s | Product of Example 6 | 30 | 9 (33.5) | 0 | Muddy |
| t* | Product of Example 6 | 60 | 10 (26.7) | 0 | Yellow, transparent |
| u* | Product of Example 6 | 120 | 1 | 22.5(80.3) | Yellow, transparent |

Note:
Horizontal lines denote emulsions treated on same day
*Clear water layer formed immediately after addition of demulsifier.
**A commercial 4,000,000 molecular weight poly(ethylene oxide).

We claim:
1. A process for recovering petroleum from O/W bitumen emulsions by demulsifying said emulsions by adding thereto demulsifiers comprising co-polymers of monomers having the general structure

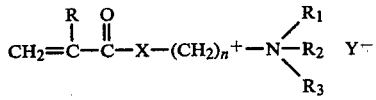

where =H or lower alkyl, X=NH or O, n=>1, $R_1$ and $R_2$=alkyl, $R_3$=alkyl, alkenyl, alkylaryl, or hydroxyalkyl, and Y=an anion wherein the co-polymer contained about 60% or greater of said monomer.

2. A process for recovering petroleum from O/W bitumen emulsions by demulsifying said emulsions by adding thereto demulsifiers comprising co-polymers of monomers having the general structure

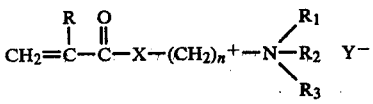

where $R=CH_3$, X=NH or O, n has a value from 2 to 3, and $R_1$ and $R_2=CH_3$, $R_3$=alkyl, alkenyl, alkylaryl or hydroxyalkyl and Y=an anion wherein the co-polymer contained about 60% or greater of said monomer.

* * * * *